United States Patent [19]

Arnold

[11] Patent Number: 4,529,877
[45] Date of Patent: Jul. 16, 1985

[54] BOREHOLE COMPENSATED DENSITY LOGS CORRECTED FOR NATURALLY OCCURRING GAMMA RAYS

[75] Inventor: Dan M. Arnold, Houston, Tex.

[73] Assignee: Halliburton Company, Duncan, Okla.

[21] Appl. No.: 444,407

[22] Filed: Nov. 24, 1982

[51] Int. Cl.$^3$ .............................................. G01V 5/00
[52] U.S. Cl. .................................... 250/256; 250/266
[58] Field of Search ................ 250/256, 264, 265, 266

[56] References Cited

U.S. PATENT DOCUMENTS

| | | | |
|---|---|---|---|
| 3,321,625 | 5/1967 | Wahl | 250/266 |
| 4,048,495 | 9/1977 | Ellis | 250/266 |
| 4,297,575 | 10/1981 | Smith, Jr. et al. | 250/266 |

Primary Examiner—Janice A. Howell
Attorney, Agent, or Firm—William J. Beard

[57] ABSTRACT

A method for measuring formation density is disclosed. It provides a corrected gamma gamma-type density log having a correction for the adverse effects of gamma radiation from thorium, uranium and potassium ore bodies. The adjacent formation is irradiated with gamma radiation preferably from a cesium ($Cs^{137}$) source which emits gamma radiation at 0.663 Mev. Two differently longitudinally spaced detectors are used, a short spaced detector and a long spaced detector. A gamma ray spectrum observed at one of the detectors is broken down into four energy windows across the spectrum and count rate signals are determined and corrected to separate the naturally occurring gamma radiation from the scattered gamma radiation. This information may then be combined with count rate information from the other detector, thereby yielding a compensated density log corrected from naturally occurring gamma rays.

12 Claims, 4 Drawing Figures

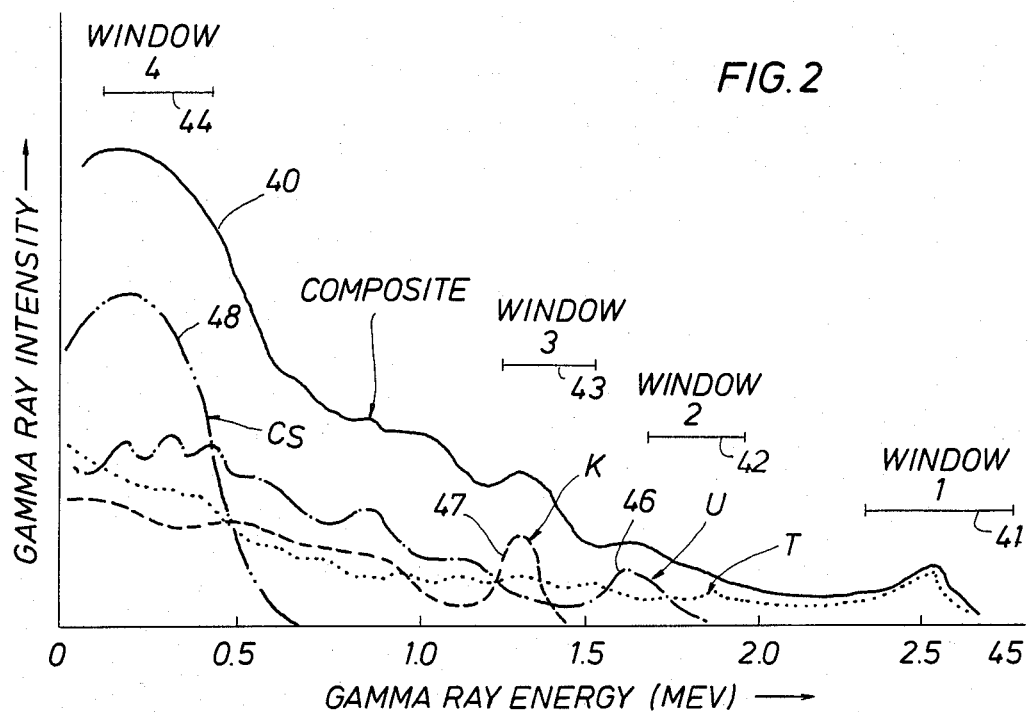
FIG. 2
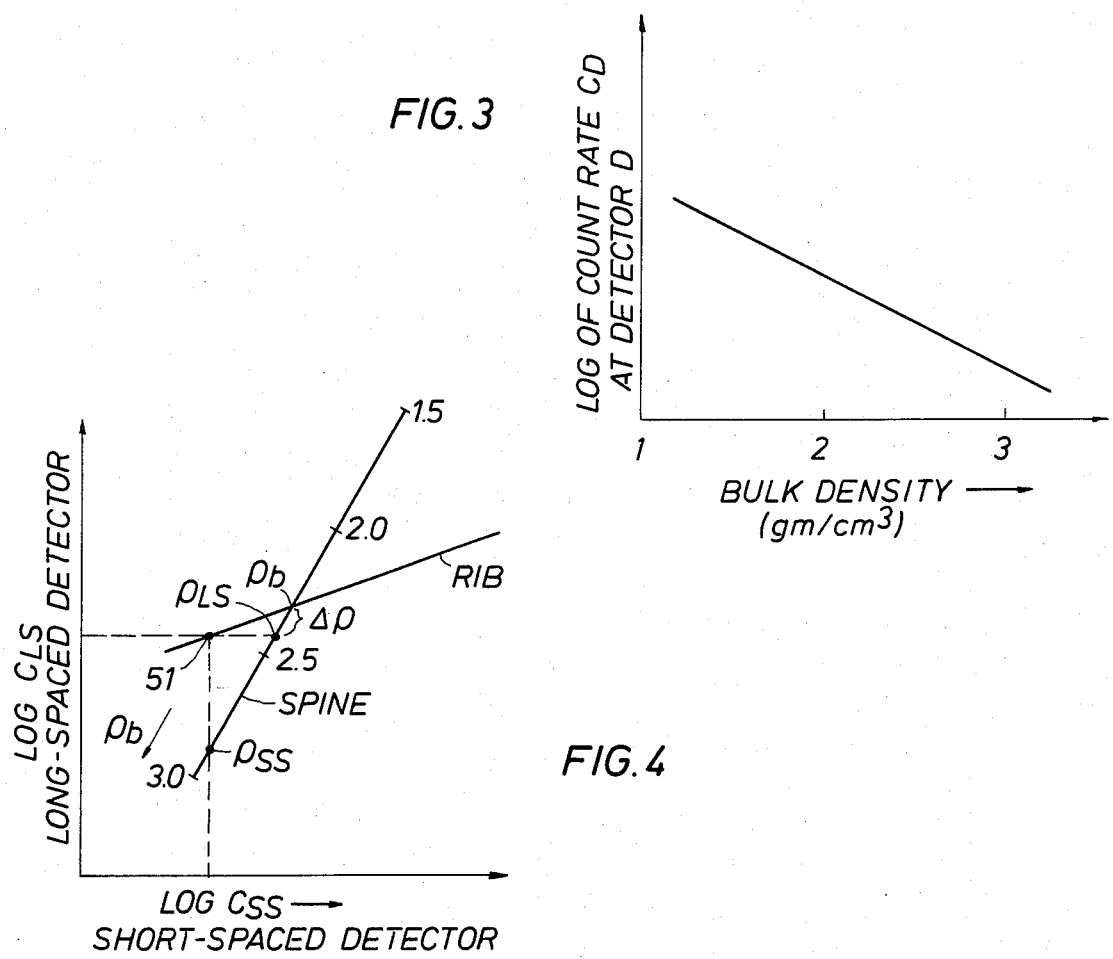
FIG. 3
FIG. 4

4,529,877

BOREHOLE COMPENSATED DENSITY LOGS CORRECTED FOR NATURALLY OCCURRING GAMMA RAYS

BACKGROUND OF THE DISCLOSURE

This invention relates to a gamma ray scattering or gamma-gamma density well logging technique which is carried out in the presence of background radiation, and more particularly, to techniques for determining formation bulk density notwithstanding the background radiation. The term background radiation refers to radiation naturally occurring in earth formation in the vicinity of a well borehole, and typically is formed by the decay of potassium, uranium or thorium and their daughter decay products (referred to herein as K-U-T elements). In formations rich in these elements the naturally occurring background can be substantial.

This disclosure is directed to well logging tools to be used in either old wells or in new wells. It is often necessary to use nuclear measurement techniques to measure formation characteristics. This is true of both old and new wells, new wells including wells which have been drilled but not necessarily cemented and cased. An attractive technique is the gamma ray scattering approach, sometimes called gamma-gamma density measurement of formation bulk density. The bulk density is derived from the scattering characteristics of the formation for relatively low energy gamma radiation emitted from a radiation source carried in a downhole sonde. In gamma-gamma logging, a gamma ray source is utilized to irradiate formations adjacent to the well borehole. This may occur in an open borehole (one with no casing and cement) or may occur in an older well having various thicknesses of casing. The formation is irradiated from the source and scatters gamma rays impinging on it which are detected by a pair of spaced gamma ray detectors which produce count rate signals. The signals are interpreted in terms of electron density or formation bulk density of the various strata or earth's formations adjacent to the borehole. The measurement of bulk density is used to determine other formation parameters of interest. As an example, bulk density along with the response of a neutron log can be used to identify gas saturated formations. Recently issued U.S. Pat. No. 4,297,575 sets forth a procedure whereby bulk density can be determined, and thickness of the casing in a cased hole is also indicated. This is accomplished in the presence of minimal background radiation. In some situations, the well borehole may pass through sufficient concentrations of the K-U-T natural gamma radiation to experience sufficient K-U-T background radiation that the data which would otherwise be obtained is obscured. Because the K-U-T radioactive isotopes have a relatively long half-life, if they are found anywhere in the near vicinity of the borehole, they can pose a background radiation problem.

This invention sets forth a new, useful and unobvious technique which yields borehole compensated density measurements corrected for the effects of naturally occurring gamma radiation. The technique utilizes only two detectors. One of the detectors is operated to obtain a gamma ray energy spectrum. The spectrum is divided into four energy windows. Once corrections are made to remove the effect of the naturally occurring gamma radiation in the second detector, the bulk density and density correction are computed utilizing a "spine and rib" procedure, thereby obtaining density independent of gamma ray impingement from the formation of interest. As a by product, this technique also yields K-U-T elemental concentrations.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

FIG. 2 is a graphical illustration relating the gamma ray energy intensity to gamma ray energy level and showing a hypothetical spectrum from various radiation sources to be described;

FIG. 3 is a graphical illustration, showing the relationship of the logarithm of the count rate at a detector in a gamma ray density tool as a function of the formation bulk density; and FIG. 4 is a graphical illustration showing the formation bulk density of the earth's formations in the vicinity of a well borehole as a function of the logarithm of the counting rate at short spaced and long spaced detectors.

DESCRIPTION OF THE PREFERRED EMBODIMENT

Figure 1:
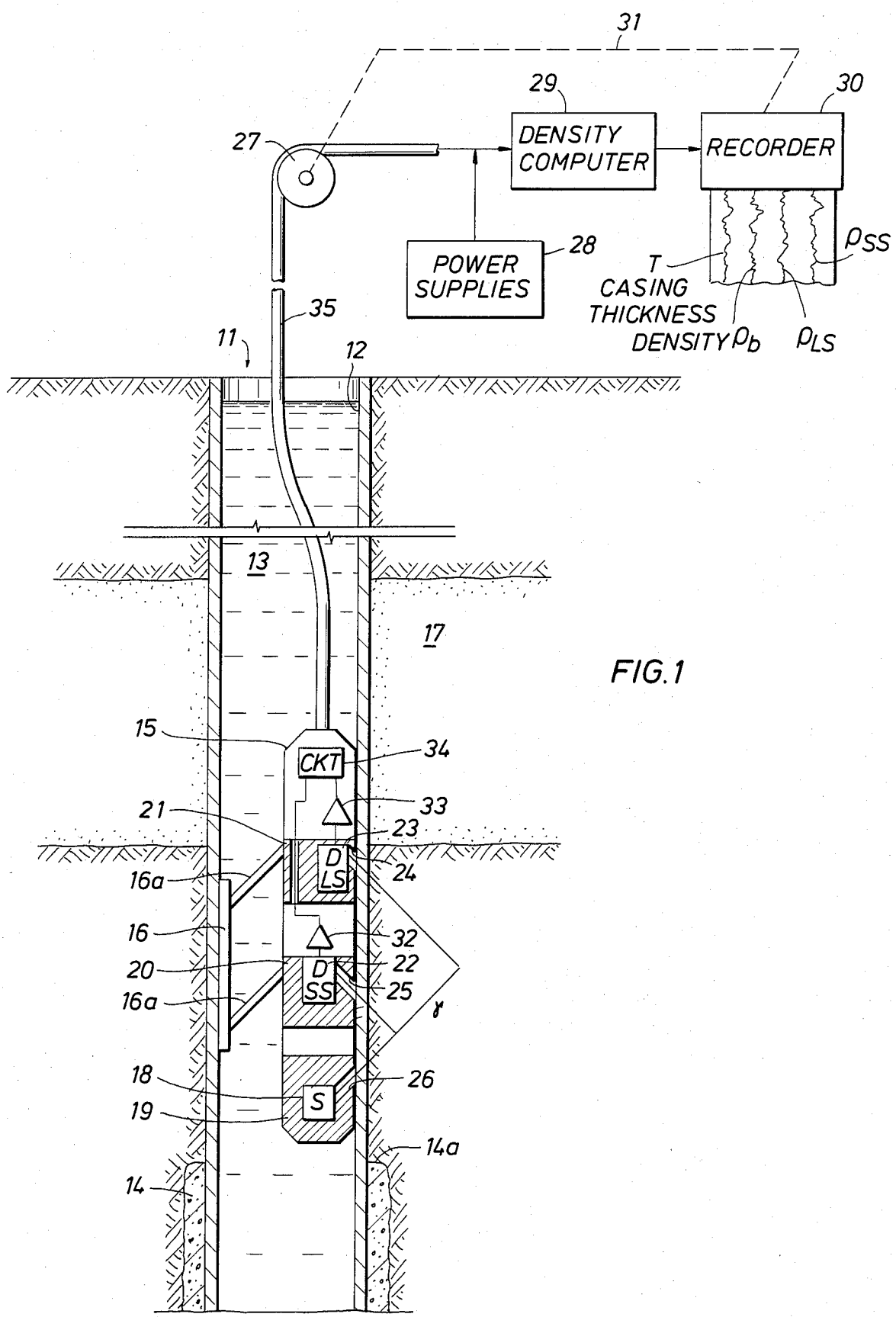
FIG. 1 is a schematic illustration showing a well logging system in accordance with the concepts of the present invention.

Before discussing the measurement systems of the present invention, it will be helpful to review briefly, the theory of gamma ray scattering or gamma-gamma density logging to more clearly illustrate the principle of the present invention. The discussion below first assumes that the naturally occurring gamma radiation intensity is quite small or negligible in comparison with the scattered gamma ray intensity.

In gamma ray density logging, gamma rays are emitted from a source contained in a well tool lowered into the well borehole. The instrument is urged against the side of the borehole wall by a backup arm or tool eccentering device as illustrated in FIG. 1. The gamma rays emitted from the source penetrate through the tool case, borehole and into the formation including any casing surrounding the wellbore. A fraction of these gamma rays are scattered back into the tool and are detected and counted by one or more gamma ray detectors in the tool. The attenuation which the gamma rays undergo between the source and detector can, under certain conditions, be very simply related to the formation bulk density. Equation (1) relates the count rate C observed in a detector to the formulation bulk density $\rho_b$ for $\rho_b \gtrsim 0.5$ gm/cm$^3$.

$$C = I_o e^{-\mu_m X(SD)\rho_b'} \qquad (1)$$

In this expression, $I_o$ is a constant related to the strength and geometry of the gamma ray source, and the geometry and efficiency of the gamma ray detector(s), $\mu_m$ is the mass attenuation coefficient of the zone through which the detected gamma rays passed, X(SD)

is a geometric factor related to the source detector paths across which the gamma rays must travel to be counted by the tool, and e is the Napierian logarithm base. Simply stated Equation (1) indicates that the count rate will decrease exponentially as the mass attenuation coefficient or density of the formation/borehole increases, and also as the source to detector spacing increases.

The variable $\mu_m$ is actually the sum of three terms corresponding to three processes with which gamma rays can interact with matter. The expression for $\mu_m$ is given by Equation (2).

$$\mu_m = \mu_{photo} + \mu_{pair} + \mu_{comp} \tag{2}$$

The first term in Equation (2), $\mu_{photo}$, refers to gamma ray attenuation due to photoelectric absorption. In this process, the gamma ray is removed from the formation and its energy is given to an electron orbiting one of the formation nuclei. The second term $\mu_{pair}$, refers to gamma ray attenuation due to pair production. In this process, the gamma ray is converted to an electron positron pair and again, the gamma ray is completely removed from the medium. The third term, $\mu_{comp}$, relates to gamma ray attenuation due to Compton scattering. In this process, the gamma ray is not removed, but loses energy and changes directions, as it scatters from the electrons of atoms comprising the earth formations.

Of these three processes, only Compton scattering is not highly dependent upon the specific elements in the medium. In fact, $\mu_{comp}$ is about the same for all elements commonly found in the formation and borehole. On the other hand, $\mu_{pair}$ and $\mu_{photo}$ are strongly related to the atomic number Z of the nuclei in the earth formations and exhibit very strong gamma ray energy dependence.

If a density logging tool is designed to respond only to Compton scattered radiation, then the count rate C at a detector is given by the Equation (3).

$$C = I_o e^{-X'\rho e} \tag{3}$$

where $\rho_e$ is the electron density of the medium and X' is a constant. The electron density $\rho_e$ is related to the formation bulk density $\rho_b$ through Equation (4) for compound materials.

$$\rho_e = 2\rho_b \frac{\Sigma_i Z_i}{M} \tag{4}$$

In Equation (4), $\Sigma_i Z_i$ is the sum of the atomic number of all the atoms making upon the molecules in the compound, and M is the molecular weight of the compound. For materials containing more than one compound, $\rho_e = \Sigma_j V_j \rho_{ej}$ where $\rho_{ej}$ is the electron density of the jth compound and $V_j$ is the volume fraction of the jth compound. For most materials found in earth formations, $$2\frac{\Sigma_i Z_i}{M} \approx 1 \tag{5}$$

Therefore, the count rate in most formations is related to the bulk density of the formation $\rho_b$ is given in Equation (6)

$$C \approx I_o e^{\alpha \rho_b} \tag{6}$$

where $\alpha$ is a constant.

If the measured gamma ray energies include a range affected by either pair production or photoelectric attenuation, then the count rates will be lower in the detectors than that predicted by Equation (6). The amount of count rate reduction will be dependent on the type of concentration of elements present in the formation and borehole vicinity. For these reasons, it is desirable in a conventional density log to try to eliminate pair production and photoelectric effects from the log measurements.

Pair production cannot take place if the initial gamma ray energy level E is less than 1.02 MeV. Accordingly, most well logging density tools are designed to use gamma ray sources having an initial energy less than 1.02 MeV. A typical such source is cesium 137 having an initial gamma ray energy level of 0.66 MeV. Photoelectric attenuation on the other hand is predominant at low gamma ray energies, occurring with a probability approximately proportional to $Z^4/E^3$. To reduce photoelectric effects, collimators designed to strongly attenuate low energy scattered gamma rays are placed around the detectors. In addition, detector threshold discriminators may be used to prevent low energy gamma rays from being counted. The gamma ray density tool then measures gamma radiation above a level of energy such that for most elements encountered in a well borehole environment the term $\mu_{photo}$ is small. This minimizes photoelectric absorption as a source of density log error. In certain well borehole fluids such as those containing barium or barite muds, the barium has a sufficiently high Z so that this term affects the recorded count rate.

A dense medium close to a detector, such as iron casing, can likewise influence the measurement made by the detector. If a dense iron casing is closer to the detector than the formation, even though it be relatively thin, its proximity can cause it to influence the count rate more than rhe thicker formation located further away. The mass attenuation coefficient $\mu_m$ in Equation (1) is therefore larger than expected because of an appreciable increase in Compton scattering. This results in the detector counting rates being normally lowered from the simple case of direct formation contact of the tool. However, the use of a second spaced gamma ray detector can be applied in such instance to correct or compensate for this.

It will be recalled, that the count rate in a single detector is given by the relationship of Equation (6). Taking the logarithm of both sides of Equation (6) yields Equation (7)

$$\log(C) = A - B\rho_b \tag{7}$$

This relationship where A and B are constants is illustrated graphically in FIG. 3. The log of formation density can be converted into density in the known manner; mention of formation density (whether true or the log of the value) hereinafter implies a routine conversion from one to the other. A single detector density tool however can only give accurate results for formation bulk density $\rho_b$ if there is no mud cake, casing or any other type of intervening material between the formation and the side of the instrument. The presence of mud cake or casing having a different density from that of the formation can distort the measurement. This is due to the fact that some of the gamma rays from the source will reach the detector through the mud cake or casing and some through the formation. The fraction which come through the mud cake or casing will be a function of the mud cake or casing thickness and density. The result is that the detector will "see" an apparent density intermediate between that of the mud cake or casing and the formation. To correct or compensate for this error, a second detector is used in the gamma ray density system of the present invention. This is illustrated in the system of FIG. 1.

If the count rate in the short spaced detector of such an instrument is plotted versus the count rate in the long spaced detector where no mud cake or casing is present between the detectors and the earth formations a line labelled as a "spine" in FIG. 4 is obtained. The density line labelled spine in FIG. 4 has the property that the count rate in either detector will uniquely determine the formation bulk density. If a mud cake or casing thickness is interposed, however, between the formation and the detectors, the count rates in both detectors will change. The mud cake or casing will occupy a larger percentage of the volume sensed by the short spaced detector than that sensed by long spaced detector. The short spaced detector count rate will change more than the long spaced detector count rate. This will cause the short spaced detector to indicate an apparent formation density $\rho_{ss}$ which is different from the density $\rho_{ls}$ indicated by long spaced detector. The difference between these two apparent densities is directly proportional to the amount of correction, $\Delta\rho$ which must be applied to the long spaced density $\rho_{ls}$ to obtain formation bulk density $\rho_b$ which is compensated for the intervening material. This may be expressed mathematically the relationship of Equation (8).

$$\rho_b = \rho_{ls} + \Delta\rho \quad (8)$$

where $\Delta\rho = K(\rho_{ls} - \rho_{ss})$, K being a constant. Note that if both detectors indicate the same density, no correction is required. In this case, both detectors are "seeing" the same material. This will be the case with negligible thickness of mud cake in the borehole or without casing. As the mud cake or casing thickness in increased or the casing thickness is increased the absolute value of $\Delta\rho$ gets larger. A denser medium than the formation near the short spaced detector will cause a negative $\Delta\rho$ while a less dense medium nearer the short spaced detector will cause a positive $\Delta\rho$.

The solution of Equation (8) where $\rho_{ls}$ and $\rho_{ss}$ are related to count rates by equations similar to that of Equation (7), is calculated in a surface density computer 29 of FIG. 1 in the present invention. In addition, a compensated formation density $\rho_b$ log is calculated using the computed values $\rho_{ls}$, $\rho_{ss}$, and Equation (8).

NATURALLY OCCURRING GAMMA RADIATION

The foregoing development ignores naturally occurring gamma radiation. While this might be an accurate premise in some boreholes, it is assumed that the present technique will be used in boreholes which pass sufficiently close to K-U-T elements, yielding an intensity of natural gamma radiation which is appreciable in contrast with the scattered gamma radiation discussed above. Equations (1) through (8) developed above, assume that the naturally occurring gamma radiation is negligible. Where it is significant, the procedure described below is a technique for removing the effect of natural radiation so that the bulk density can be obtained in the manner taught above.

This technique works well with a sonde which contains two detectors, one being termed the long spaced detector and the other being the short spaced detector. The long spaced detector is more remote from the radiation source. Because it is further from the source, the radiation levels normally occurring at the long spaced detector are somewhat lower and it can therefore be made a more sensitive type of detector such as a scintillation detector. Typically the long spaced scintillation detector operates where the ratio of natural to scattered gamma radiation is larger than the case for the short spaced detector, which may be of the Geiger-Muller type or of the scintillation type. Such an apparatus is shown in FIG. 1. There is a radiation source included in FIG. 1 which is a measured quantity of cesium 137 which isotope emits gamma radiation having an energy level of 0.663 MeV. FIG. 1 shows hypothetical paths of travel whereby the emitted gamma radiation from the cesium source impinges on the adjacent earth's formations and is scattered and part of the scattering is in the direction of the two detectors.

FIG. 2 of the drawings shows a typical gamma ray energy spectrum observed at the long spaced scintillation detector from a formation containing appreciable quantities of the K-U-T elements. In FIG. 2, the representative composite spectrum actually observed is identified by the curve 40. The spectrum range is divided into four windows. Windows 41-44 inclusive are marked in FIG. 2 and encompass the following nominal ranges:

| Window No. | Energy Range |
| --- | --- |
| 1 | 2.4 to 2.8 MeV |
| 2 | 1.7 to 1.95 MeV |
| 3 | 1.4 to 1.6 MeV |
| 4 | 0.2 to 0.6 MeV |

The observed composite spectrum (the solid curve 40) is made up from radiation from the naturally occurring K-U-T elements as well as scatter radiation from the cesium 137 source. Representative spectra which form the composite 40 are the spectrum 45 for thorium, the spectrum 46 for uranium, the spectrum 47 for potassium, and the radiation 48 attributable to the scattered cesium 137 radiation.

Counts are accumulated or recorded in the various energy ranges or windows. For purposes of notation, the subscripts ls and ss identify long spaced and short spaced detectors respectively. Referring to the windows as numbered (1 through 4 in FIG. 2), one obtains the definition given in Equation (9):

$$C_{i,k} \equiv \text{the count rate measured in window } i \text{ of detector } k \quad (9)$$

Where
i = 1,2,3,4
k = ss or ls

In similar fashion, the count rate attributable to a particular element is defined as:

$$C_{i,j,k} \equiv \text{the count rate in window } i \text{ from element } j \text{ in detector } k \quad (10)$$

Where
i = 1,2,3, or 4;
j = K, U, T or Cs;
k = ss or ls.

The count rate from the windows 1 ... 4 can be observed and the measured count rates have values which are given by Equations (11-14) below:

$$C_{4,T,ls} = K_4 C_{1,ls} \quad (11)$$

$$C_{4,U,ls} = K_5(C_{2,ls} - K_1 C_{1,ls}) \quad (12)$$

$$C_{4,K,ls} = K_6(C_{3,ls} - K_2 C_{1,ls} - K_3(C_{2,ls} - K_1 C_{1,ls})) \quad (13)$$

$$C_{4,Cs,ls} = C_{4,ls} - (C_{4,T,ls} + C_{4,u,ls} + C_{4,k,ls}) \quad (14)$$

The quantities $K_1$ ($1=1,\ldots,6$) are calibration constants defined as:

$$K_1 = C_{2,ls}/C_{1,ls} \quad (15)$$

$$K_2 = C_{3,ls}/C_{1,ls} \quad (16)$$

$$K_3 = C_{3,ls}/C_{2,ls} \quad (17)$$

$$K_4 = C_{4,ls}/C_{1,ls} \quad (18)$$

$$K_5 = C_{4,ls}/C_{2,ls} \quad (19)$$

$$K_6 = C_{4,ls}/C_{3,ls} \quad (20)$$

The calibration constants given above are obtained from calibration facilities. Calibration constants $K_1$, $K_2$ and $K_4$ are measured in calibration facilities by placing the apparatus in a specimen wellbore for calibration purposes wherein the adjacent formation includes only radioactive thorium isotopes. The calibration constants $K_3$ and $K_5$ are measured in similar facilities containing only radioactive uranium isotopes. The calibration constant $K_6$ is measured in a similar facility wherein the formation contains only potassium radioactive isotopes.

Provided with these calibration constants, Equations (11), (12) and (13) are solved using measured composite count rates $C_{i,ls}$ and the calibration constants given by Equations (15)–(20) above to solve for $C_{4,T,ls}$, $C_{4,U,ls}$ and $C_{4,K,ls}$. Recall that $C_{4,T,ls}$, $C_{4,U,ls}$, and $C_{4,K,ls}$ are count rates recorded in window 4 due to thorium, uranium and potassium, respectively. These count rates can be used to determine the concentrations of thorium ($M_T$), Uranium ($M_U$) and potassium ($M_K$) in the formation by using the equations:

$$M_T = C_{4,T,ls}/Q_T \quad (20a)$$

$$M_U = C_{4,U,ls}/Q_U \quad (20b)$$

$$M_K = C_{4,K,ls}/Q_K \quad (20c)$$

where $Q_T$, $Q_U$ and $Q_K$ are concentration calibration consultants measured in calibration facilities containing known amounts of thorium, uranium and potassium, respectively. Solution of Equations (11), (12) and (13) for the isolated count rates described above permits solution of Equation (14) thereafter to determine $C_{4,Cs,ls}$. This value is the count rate in the fourth window at the long spaced detector due only the scattered gamma radiation from the cesium 137 source.

The relative placement of the long and short detectors positions or locates the long detector sufficiently far from the cesium source that there is a reduced level of scattered gamma radiation attributable to the source. However, the observed count rates at both detectors from the K-U-T elements in window 4 are related to one another. This results from the geometry of the wellbore in the formation. To the extent that any of the K-U-T elements are in the formation, the radiation experienced by the short spaced detector and long spaced detector is related by the constants $K_7$, $K_8$ and $K_9$ which are calibration constants defined in Equations (22), (23) and (24) below. These constants are used in Equation (21) to obtain the count rate in window 4 of the short spaced detector due only to the scattered gamma radiation from the cesium 137 source.

$$C_{4,Cs,ss} = C_{4,ss} - (K_7 C_{4,T,ls} + K_8 C_{4,U,ls} + K_9 C_{4,K,ls}) \quad (21)$$

The calibration constants are defined:

$$K_7 = C_{4,ss}/C_{4,ls} \quad (22)$$

$$K_8 = C_{4,ss}/C_{4,ss} \quad (23)$$

$$K_9 = C_{4,ss}/C_{4,ls} \quad (24)$$

The calibration constants are obtained from calibration boreholes having only thorium, or only uranium, or only potassium respectively for Equations (22)–(24).

Equation (21) is solved to determined the count rate in window 4 of the short spaced detector due only to the scattered gamma radiation. The factors on the right of Equation (21) are obtained from Equations (11), (12) and (13) in the manner previously described. The measured composite count rate in the fourth window of the short spaced detector, $C_{4,ss}$, is provided for Equation (21) to thereby enable the solution of Equation (21). These computations may easily be performed in real time by a suitable program in surface computer 29 of FIG. 1.

Using Equations (14) and (21) to obtain the count rates in the fourth window from the scattered gamma radiation at both detectors, the borehole compensated formation bulk density $\rho_b$ and the density correction factor $\Delta\rho$ are next determined as previously discussed with respect to FIG. 4. The borehole compensated formation bulk density is given by Equation (7), while a value of the density correction can be obtained by Equation (8). The procedure involving Equations (14) and (21) is thus first carried out to then enable calculation's to obtain the compensated bulk density and density correction factors from Equations (7) and (8) as described. Perhaps examples will assist in understanding this.

A hypothetical example of data with casing interposed between the detectors and the earth formations is illustrated in FIG. 4, where the density of the intervening material is greater than that of the formation. Long spaced detector count rate $C_{ls}$ and short spaced detector count rate $C_{ss}$ corresponding to a point 51 of FIG. 4 are obtained by the procedure beginning with equation (10) through equation (21). Once these count rates are corrected to remove the counts attributable to the K-U-T elements, it is then possible to follow the procedure set forth in equation (1) through (8). At this juncture it is no longer necessary to identify the measured count rates with the nomenclature $C_{4,Cs,ls}$ and $C_{4,Cs,ss}$ because the measured counts, corrected after removal of the effects of naturally occurring radiation, are primarily only in the fourth window (see FIG. 2) and result only from the cesium 137 scattered gamma rays.

The point 51 falls on a line labelled "rib" in FIG. 4. It will be observed that an apparently higher density $\rho_{ss}$ for the short spaced detector count rate is indicated relative to that labelled $\rho_{ls}$ as derived from the count rate in the long spaced detector. This is due to the interposition of the standoff of the detectors from the formation caused by casing with density greater that of the formation. However, when the instrument has been calibrated in known formations with different casing or in uncased boreholes, mud cake thickness, the rib line of FIG. 4 is defined. If the thickness of the intervening material is small with respect to the depth of the investigation for the tool and/or if the density of the intervening material is relatively close to the density of the formation, the rib will be a straight line as assumed in Equation (8). Under these conditions $\rho_b$ computed from Equation (8) is equal to formation bulk density $\rho_b$ (after log conversion) and can be observed graphically as the intersection of the rib line with the spine line in FIG. 4. Each density point along the spine will have its own rib and, if the previous restriction on the intervening materials are met, all of these ribs are straight lines and are parallel. The $\Delta \rho$ log correction measured along the spine is also indicated in FIG. 4. Steel casing whose thickness is greater than 0.20 inches is usually sufficiently thick and dense to cause the ribs to come curved rather than straight lines. Under these conditions, $\rho_b$ computed from $\rho_{ls}$, and Equation (8) will not equal the true formation bulk density $\rho_b$. Still, by appropriately calibrating a well logging instrument according to the concepts of the present invention in known formations and with known muds or casings, spine and rib plots similar to that of FIG. 4 may be generated for a variety of conditions. These data along with other data relating casing thickness to the $\Delta \rho$ correction may be entered into the surface computer 29 to determine true compensated formation density in accordance with the concepts of the present invention.

Referring now to FIG. 1, a well logging system in accordance with the concepts of the present invention is illustrated schematically. A well borehole 11 is lined with steel casing 12 and filled with a borehole fluid 13. The borehole 11 penetrates earth formations 17 and near the lower portion thereof shown in the drawing of FIG. 1 is cemented in place by a cement sheath 14 which stops at a cement top 14a. The borehole may be cased or uncased. The borehole may be empty or filled with drilling mud, water or the like. The annular cement may be included or omitted. The actual circumstances may vary from well to well. The well logging instrument 15 is suspended via well logging cable 35 of the conventional armored type used in the art.

Above the cement top 14a, a well logging sonde 15 of fluid tight, hollow design is urged against the casing 12 by a backup pad or skid 16, which is supported by pad support arms 16a. The fluid tight, hollow body member or sonde contains near the lower end thereof, a gamma ray source 18 which, as hereinbefore stated, may comprise a source such as cesium 137 which emits primarily 0.66 MeV gamma rays. The gamma ray source 18 is surrounded by a gamma ray shielding material 19 having a channel or collimator 26 therein for emitting gamma rays into the formation as shown schematically in FIG. 1. Longitudinally spaced from the gamma ray source 18, is a first short spaced gamma ray detector 22. Detector 22 is surrounded by gamma ray shielding material 20 and has a collimation port or slot 25 cut therein for allowing gamma rays to enter in the manner illustrated in FIG. 1. The gamma ray detector 22 may comprise a Geiger-Muller tube or a scintillation type detector comprising a thallium activated sodium or cesium iodide crystal optically coupled to a photomultiplier tube. Impingement upon detector 22 of gamma rays scattered from the earth formation 17 causes voltage pulsed to be generated by the detector which are amplified by amplifier 32 and conducted to a cable driver circuit 34 for transmission to the surface of the earth via conductor of well logging cable 35. Similarly, a second longitudinally spaced gamma ray detector 23 is spaced at a longer distance from the gamma ray source 18 and is surrounding by gamma ray shielding material 21 having a collimation port 24 machined therein. The gamma ray shielding material 19, 20 and 21, may comprise for example, lead or tungsten or a combination thereof. Such materials are relatively opaque to the transmission of gamma rays.

The long spaced detector 23 may also comprise for example, a thallium activated sodium or cesium iodide scintillation crystal optically coupled to a photomultiplier tube. A gamma ray impinging upon detector 23 produces a voltage pulse which is conducted to an amplifier 33. Discriminator circuits of conventional type, not shown, separate the voltage pulses based on their height, or magnitude, into the four energy windows or regions shown in FIG. 2. Count rates in each energy window are digitized and supplied to a cable driver circuit 34. The cable driver circuit 34 transmits the digital information to the surface of the earth via cable conductor of well logging cable 35.

The downhole well logging instrument or sonde 15 is suspended in the borehole 11 by well logging cable 35 which passes over a sheave wheel 27 located at the surface of the earth. Revolution of the sheave wheel 27 is electrically or mechanically coupled to a well logging recorder 30 as indicated by the dotted line 31. This enables measurements made by the downhole instrument to be recorded as a function of borehole depth.

At the surface a power supply 28, supplies energy for the operation of the downhole instrument via conductors of the well logging cable 35. It will be understood by those skilled in the art that, while not shown explicitly, the downhole instrument 15 contains appropriate power supplies for converting power supplied by surface power supply 28 to appropriate voltages for operating the detectors and cable driving circuitry in the downhole sonde.

At the surface, density computer 29 receives the energy spectrum separated count signals of gamma rays transmitted from the downhole instrument 15 and separates them into the count rate signals from the short spaced and long spaced detectors. The compensated formation density computation is performed by the density computer 29 which has stored in the memory portion thereof, calibration information analogous to that illustrated in FIGS. 2, 3 and 4 and a program suitable for correcting the short spaced detector counts from the long spaced counts due to naturally occurring gamma rays.

The density computer 29 may comprise for example, a small general purpose digital computer such as the model PDP-11 constructed by the Digital Equipment Corporation of Cambridge, Mass. The computer 29 may be properly programmed in a suitable high level compiler language, such as Fortran, or in an assembly language to perform the computations, table look up, interpolation and extrapolation techniques described previously. These various density measurements ie., $\rho_b$ and formation density are supplied from computer 29 to well logging recorder 30, where they are recorded on a record medium as a function of borehole depth as illustrated schematically in FIG. 1.

To summarize the operation of the present invention, a well logging instrument having a source of gamma rays and two gamma ray detectors is lowered into a well borehole. The instrument is urged against a wall of the borehole by a backup arm or skid to provide intimate contact with the surface of the interior of a casing. Gamma rays emitted by the source are detected at a first short spaced detector and signals representative of the detected gamma rays at the short spaced detector are transmitted to the surface. Gamma rays are further detected by a second longitudinally spaced long spaced detector and signals representative of the count rate at the long spaced detector are also transmitted to the surface. Assuming naturally occurring gamma radiation from the K-U-T elements, the count rates are modified to isolate only the count rates from the scattered gamma rays. Such modification occurs at the surface in the density computer. The density computer separates the signals from the two detectors and, using first predetermined relationship, computes the uncorrected formation bulk density indicated by the count rate measurements at each of the two separate detectors. These data are then combined in a second predetermined relationship to provide a compensated formation density measurement which is compensated for the standoff caused by the casing (if any) from the earth formation surrounding the well borehole. Thus, a borehole compensated formation density measurement is provided. Simultaneous logs of the borehole and natural gamma ray compensated formation bulk density $\rho_b$ and density correction $\Delta\rho$ are provided as a function of borehole depth. In addition, concentrations of the elements thorium, uranium and potassium within the formation can be computed simultaneously in computer 29 with the results being displayed on recorder 30.

The foregoing disclosure may make other alternative embodiment of the present invention apparent to those skilled in the art. It is therefore the aim of the appended claims to cover any and all changes and modifications as fall within the true spirit and scope of the invention.

I claim:

1. A method for logging a well borehole to determine the bulk density of earth's formations in the presence of naturally occurring gamma radiation from potassium, uranium or thorium, comprising the steps of:
   (a) emitting low energy gamma radiation from a source of such radiation in a well borehole into the earth's formations surrounding a well borehole;
   (b) detecting at a first, longitudinally spaced distance from said source, gamma radiation scattered back into the borehole by the earth's formations, separating said gamma radiation into at least four separate energy regions and generating first count rate signals representative of count rates in said at least four separate energy regions;
   (c) detecting at a second, differently longitudinally spaced distance from said source, gamma radiation scattered back into the borehole by the earth's formations and generating second count rate signals representative thereof;
   (d) compensating said second count rate as a function of said first count rates to remove the increase from the naturally occurring gamma radiation; and
   (e) determining the formation bulk density from the compensated first and second count rate signals and forming a signal indicative thereof.

2. The method of claim 1 wherein said steps are performed repetitively as said source and said detectors are moved along a wellbore.

3. The method of claim 2 wherein said signal indicative of formation bulk density is recorded as a function of borehole depth.

4. The method of claim 1 wherein said first and second count rates are increased in an unpredicted fashion dependent on the concentration of potassium, uranium and thorium elements in the earth's formation near the borehole and wherein the step of compensating said second count rates as a function of said first count rates removes the unpredictable, naturally occurring gamma radiation count increases therefrom.

5. The method of claim 1 wherein the step of emitting low energy gamma radiation utilizes a source sufficiently low in energy that the scattered gamma radiation is substantially free of attenuation due to photoelectric absorption or pair production.

6. The method of claim 5 wherein the step of emitting low energy gamma radiation involves placing a cesium 137 radiation source in a logging tool having a sonde and controllably directing radiation therefrom into the earth's formations.

7. The method of claim 6 wherein the step of emitting controllably irradiates the earth formations adjacent to the borehole by directing radiation toward the earth's formations along a constrained and limited path.

8. The method of claim 6 wherein the step of emitting low energy gamma radiation utilizes a low energy gamma radiation source of sufficiently high intensity that the radiation therefrom will pass through casing up to a specified thickness in the borehole.

9. The method of claim 1 wherein the step of detecting at a first distance includes obtaining energy spectra at selected elevations in a borehole, the energy spectra including energy levels up to and including those gamma ray energy levels emitted from radioactive potassium, uranium and thorium isotopes.

10. The method of claim 1 wherein the step of detecting at a first spaced distance includes the step of forming a spectrum at a selected elevation in a borehole having gamma ray energy levels up to at least the characteristic peaks of thorium near about 2.5 MeV.

11. The method of claim 1 wherein the step of detecting at a first spaced distance includes detecting and separating into a spectrum of gamma radiation divided into a plurality of energy level windows to include the 2.61, 1.76, and 1.46 MeV gamma radiation peaks from the decay from thorium, uranium and potassium and further including a fourth energy window to include scattered low energy gamma radiation from the first step of claim 1.

12. The method of claim 11 wherein the step of separating the spectrum into the four specified energy windows further includes the step of measuring the count rate in each of the four energy windows and isolating the count rates in the spectrum attributable to naturally occurring radiation from potassium, uranium or thorium and then using said count rates to simultaneously determine the elemental concentrations of thorium, uranium and potassium within the formation.

* * * * *